United States Patent [19]
Dicky

[11] Patent Number: 5,944,055
[45] Date of Patent: Aug. 31, 1999

[54] CONTROL VALVE WITH SWIVEL CONNECTOR

[76] Inventor: Julius Dicky, 843 Bougainvillea St., San Luis Obispo, Calif. 93401-7610

[21] Appl. No.: 09/148,770

[22] Filed: Sep. 5, 1998

Related U.S. Application Data

[60] Provisional application No. 60/058,903, Sep. 5, 1997.

[51] Int. Cl.[6] .................................................. F16K 11/087
[52] U.S. Cl. ........................................ 137/625.47; 251/148
[58] Field of Search ......................... 137/625.47; 251/148

[56] References Cited

U.S. PATENT DOCUMENTS

| | | | |
|---|---|---|---|
| 3,721,265 | 3/1973 | Hoffland | 137/625.47 |
| 3,976,102 | 8/1976 | Crocker | 137/625.47 |

*Primary Examiner*—John Fox
*Attorney, Agent, or Firm*—Walter Unterberg

[57] ABSTRACT

A T-shaped flow divider for use in watering and irrigating systems, with a swivel inflow connector, and a four-position three-hole ball control valve to direct the outflow to one or other or both of the T-arm outflow connectors, or to close off flow completely. The swivel feature permits the outflow connectors to swivel to any convenient circumferential location while the inflow connector is attached to a water supply source. This obviates the need for complete dismantling of rigid systems with 2-way valves for maintenance or changes in the system. Further, the 4-way control valve permits the accurate design of extended irrigation systems, particularly for irregular areas. One version of the flow divider has female threads on the swivel inlet flow connector for attaching to hose bibs and the like, with male threads on the outflow connectors.

9 Claims, 3 Drawing Sheets

TOP VIEW

FRONT VIEW

SECTION A

SECTION B SELECTOR ON 'CLOSED'

SECTION B SELECTOR ON 'RIGHT'

SECTION B  SELECTOR ON 'LEFT'

SECTION B  SELECTOR ON 'BOTH'

CONTROL VALVE WITH SWIVEL CONNECTOR

RELATED APPLICATION

This application covers the invention disclosed in my Provisional Patent Application Ser. No. 60/058,903 filed Sep. 5, 1997.

BACKGROUND OF THE INVENTION

1. Field of the Invention

This invention relates generally to T-shaped flow dividers used with pipes or flexible hoses for watering and irrigation. More particularly, it relates to T-shaped flow dividers having a swivel inflow connector and a multi-position ball valve to direct the outflow to one or other or both of the T-arm outflow connectors. The swivel feature permits the T-shaped divider to assume any circumferential position around the swivel connector as the latter is connected to a water supply pipe or another flow divider. Thus there is no need for a watering or irrigation system with multiple flow dividers and hoses or pipes to be completely dismantled when parts of such a system are replaced, added or removed.

2. Description of Related Art

Currently, rigid Y-shaped hose connectors are used for watering and irrigating yards, gardens and farms. These connectors require two 2-way ball valves, one in each outflow Y-arm, for complete control of water outflow. A fixed rigid female thread on the inflow arm is threaded on to the water supply faucet, while hoses can be attached to each of the male-threaded Y-arms.

These rigid Y-shaped connectors pose problems to a water user by having no quick release or disconnect of the inflow arm from the water supply faucet. Before the inflow arm can be disconnected, the hoses on the two Y-arms must be completely uncoupled, which can be inconvenient with a 2-way ball valve in each Y-arm.

Further, if a large area is to be irrigated, it would be desirable to create a manifolded network with multiple Y-shaped connectors. However, in view of the difficult connecting and disconnecting procedures with such connectors and the multiplicity of 2-way valves required, such a network would be most impractical.

The patent literature contains some attempts to deal with related problems in fluid flow dividers. U.S. Pat. No. 1,807,085 to Crickmer describes a two-way plug valve in connection with a rigid Y-shaped connector, changing the outflow from one Y-arm to the other. U.S. Pat. No. 3,721,265 to Hoffland shows a three-way plug valve for a rigid T-connector with a secondary-flow feature to avoid trapping any fluid when changing outflow paths.

U.S. Pat. No. 3,828,817 to Anderson discloses a rotatable housing for switching flow of a liquid from one sprayhead to another in agricultural applications. U.S. Pat. No. 4,951,711 to Kunz shows a a spherical cock plug able to connect to different pipe openings in a T-shaped arrangement with an operating handle mountable in locations 90 degrees apart. U.S. Pat. No. 3,976,102 to Crocker describes a three-way hose bib selector valve with a hose draining feature. This is also an arrangement with rigid piping.

In all these examples of background art the Y-shaped or T-shaped flow dividers only accept rigid connections. This means that flow system using such dividers must be completely taken apart for changes or maintenance. It is, therefore, highly desirable to provide flow dividers with features which permit connecting and disconnecting hoses and flow system components to and from faucets and each other without the need for dismantling major portions of such flow systems.

SUMMARY OF INVENTION

To overcome the problems stated above in connecting and disconnecting flow system components, the instant invention of a Control Valve with Swivel Connector has been devised. In the embodiment here disclosed the invention is a T-shaped flow divider comprising a swivel inlet flow connector, a multi-position control valve at the T-junction, and linearly opposed right and left rigid outflow connectors at right angles to the inlet connector. All connectors have standard threads. The flow divider of the invention is typically made of metal or plastic, and built around a central tubular T-body.

The swivel inflow connector has a female thread for securing to the male thread of a hose bib of a domestic water supply or to a similar source of water or any other fluid of interest. Each of the two rigid outflow connectors has a male thread for securing to female threads of standard hoses or pipes. The control valve is a three-hole ball valve able to direct the flow to the right or left outflow connector, or to both outflow connectors simultaneously.

The swivel inflow connector is a known plumbing component. Typically, the swivel is an inwardly flared sleeve with an internal female thread, placed rotatably around the inlet tube part of the central tubular T-body. In the unattached position the swivel connector is loose on the inlet tube, but prevented from sliding off the inlet tube by an annular outward flare of the tube end which engages the inward flare of the swivel sleeve.

The swivel feature permits the T-shaped divider to swivel to any circumferential position around the swivel connector as the latter is attached to the male thread of a water supply pipe. To make a watertight connection, a standard hose washer is placed at the flared end of the swivel connector which is then screwed onto the water supply pipe until the latter contacts the washer, and further to compress the washer for a watertight seal.

The three-hole ball valve is attached to a rotary valve selector handle protruding through the T-body. The handle can be rotated to the "left", "right", "both" or "closed" positions for flow control while fluid is flowing through the T-shaped divider.

The combination of the swivel inflow connector and three-hole ball valve in the T-shaped flow divider permits straightforward disconnecting of flow system components, and easy maintenance and changes in flow systems. Such procedures were problematic in flow systems with rigid connectors and two-way valves. Further, expansion of flow systems for irrigation of large areas is possible by multiple manifolding of flow dividers according to this invention with hoses and piping as required. The three-hole valves in the flow dividers enable the creation of a variety of water flow patterns in large systems which lead to improved and more economical watering or irrigation of yards, gardens and commercial farms. The invention is also useful for similar systems of fluids other than water.

BRIEF DESCRIPTION OF THE DRAWINGS

A better understanding of the invention may be gained by reference to the Detailed Description which follows, in conjunction with seven drawing Figures, each showing a different view of the invention: the T-shaped flow divider comprising a swivel inlet flow connector, a multi-position control valve, and right and left outflow connectors. In the drawing

DETAILED DESCRIPTION OF THE PREFERRED EMBODIMENT

Figure 1:
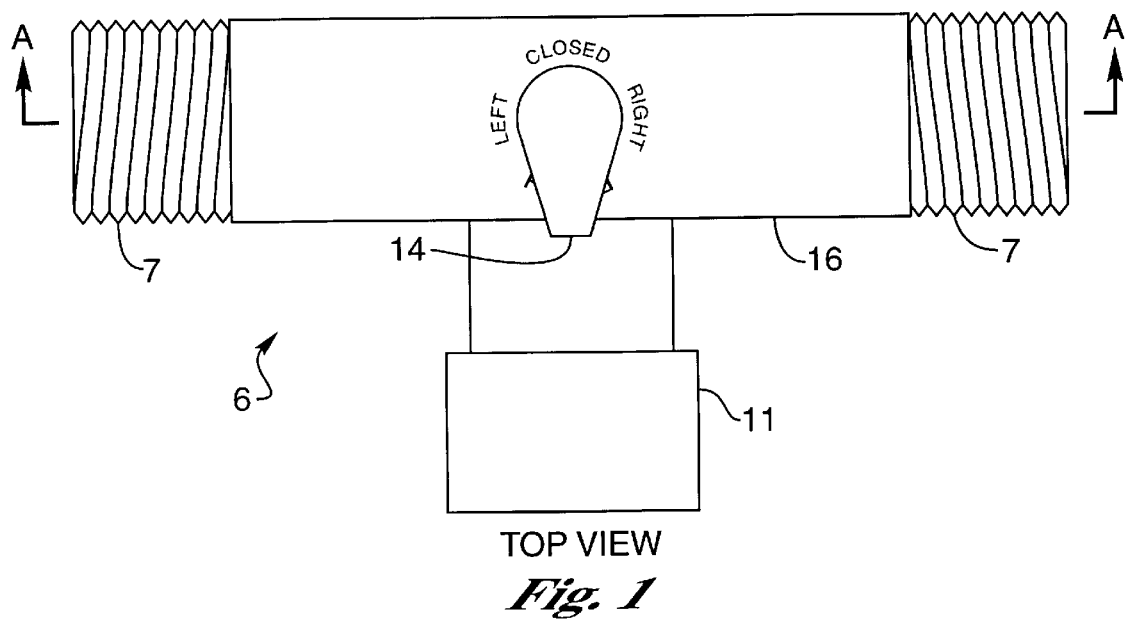
FIG. 1 is a top view of the invention.
Figure 2:
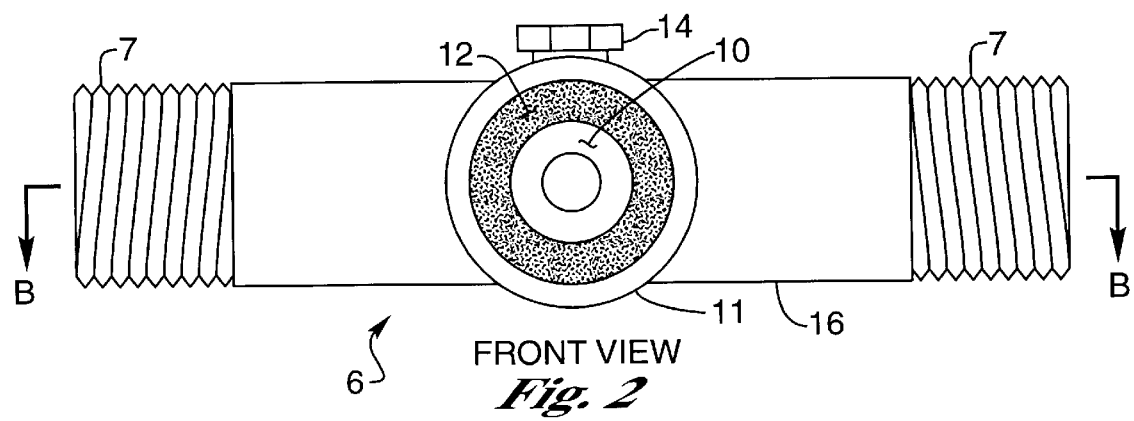
FIG. 2 is a front view of the invention.

Referring now to FIG. 1 and FIG. 2, a top and front view, respectively, of the flow divider invention 6 are shown. Attached to the three ends of the central tubular T-body 16 are the inlet flow swivel connector 11 and the right and left outflow connectors 7. Swivel connector 11 has an internal standard female thread (not shown) and includes a standard hose washer 12 for a watertight connection to a male threaded water supply faucet or hose bib. Both outflow connectors 7 carry standard male threads.

At the central T-junction of T-body 16 is located the three-hole ball control valve 10 to which is attached valve selector handle 14 which protrudes through the wall of T-body 16. By turning handle 14, valve 10 can be placed in four different flow control positions 90 degrees apart. The names of these positions are "closed", "right", "left" and "both". These names are stamped in the proper locations on the outside of T-body 16. In FIG. 1 and FIG. 2, valve 10 and handle 14 are in the "both" position, with outflow equally and simultaneously through right and left outflow connectors 7.

Figure 3:
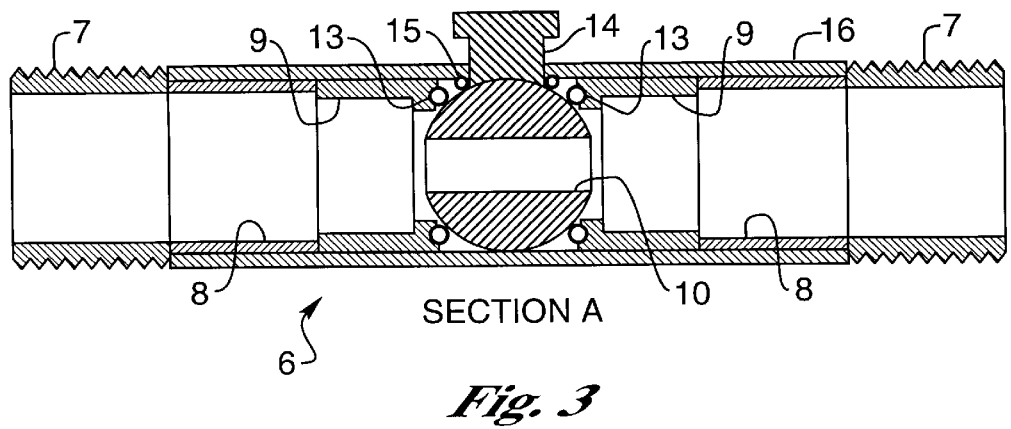
FIG. 3 is a vertical section of the invention taken along plane A—A in FIG. 1.

Referring now to FIG. 3 which is a vertical section of the invention taken along plane A—A in FIG. 1, the internal flow passage for the "both" position is illustrated. FIG. 3 also shows installation details of valve 10 which is rotatably and sealably secured in place by two valve retainer "O" rings 13 which are held in place by valve retainers 9. In turn, retainers 9 are properly positioned by sleeves 8 in T-body 16.

Selector handle 14 is inserted through a suitable central aperture into T-body 16 and attached to valve 10 in proper alignment to indicate the four valve positions correctly. The aperture is sealed against any flow leakage by selector handle "O" ring 15.

Figure 4:
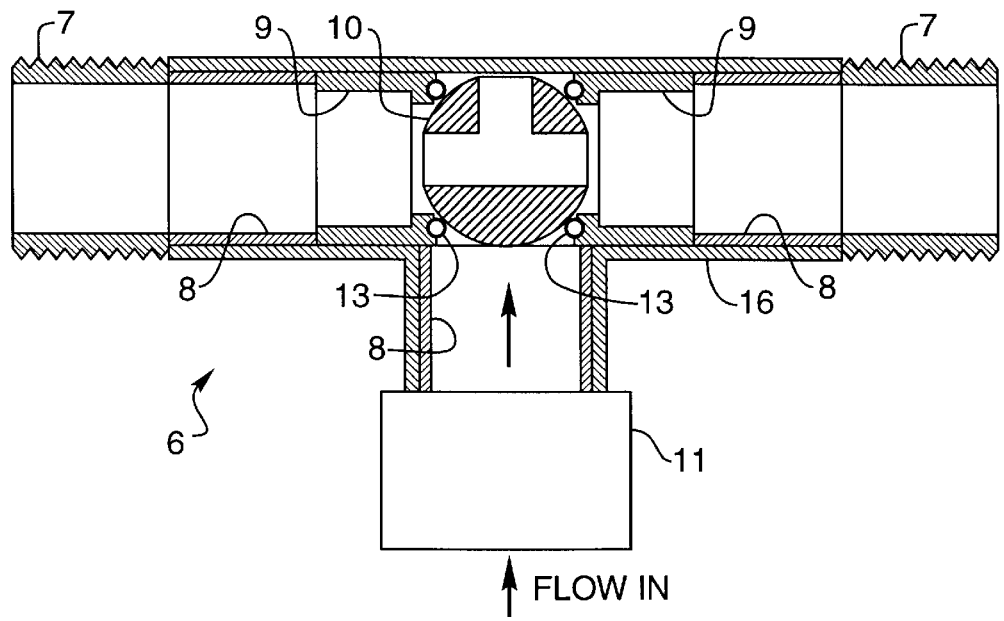
FIG. 4 is a horizontal section of the invention taken along plane B—B in FIG. 2 with the control valve in the "closed", or zero flow, position.
Figure 5:
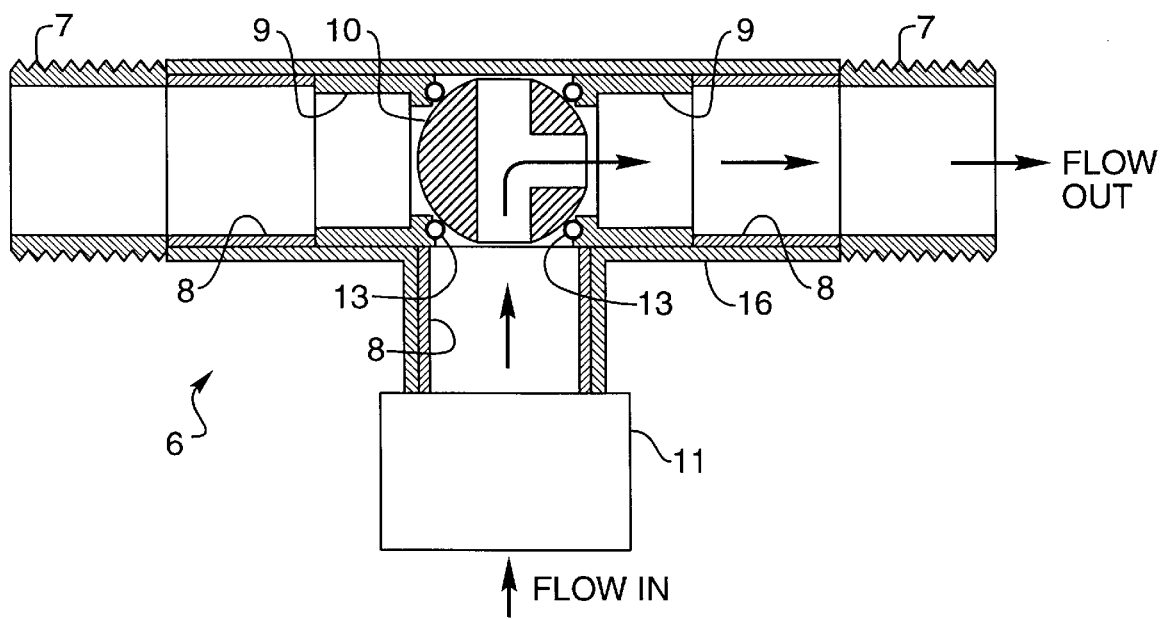
FIG. 5 is similar to FIG. 4, except that the control valve is in the "right" position, directing flow to the right outflow connector.
Figure 6:
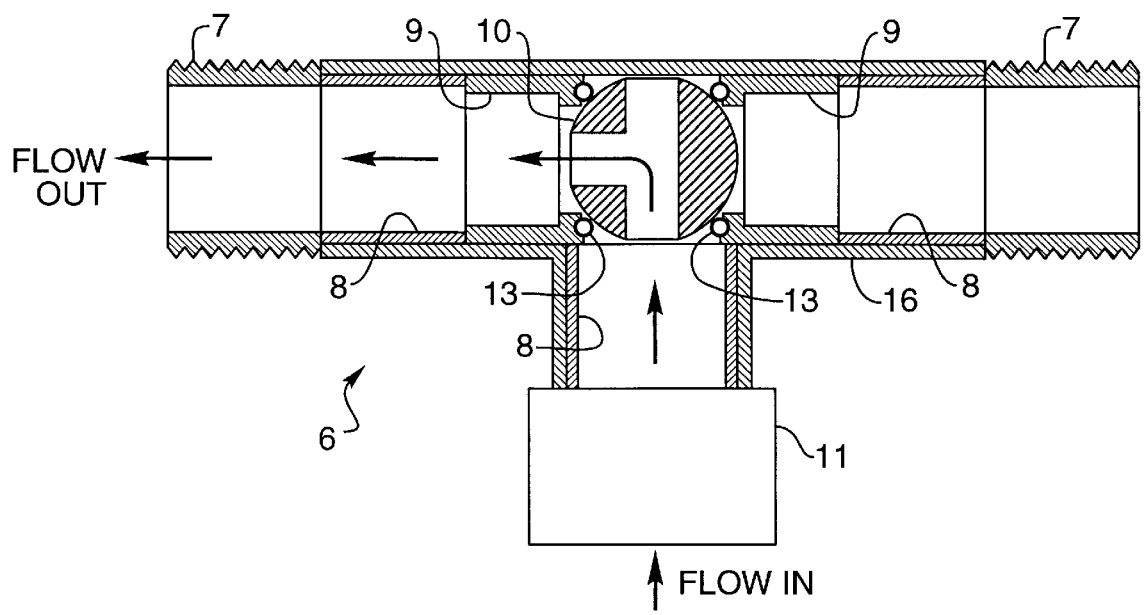
FIG. 6 is similar to FIG. 4, except that the control valve is in the "left" position, directing flow to the left outflow connector.
Figure 7:
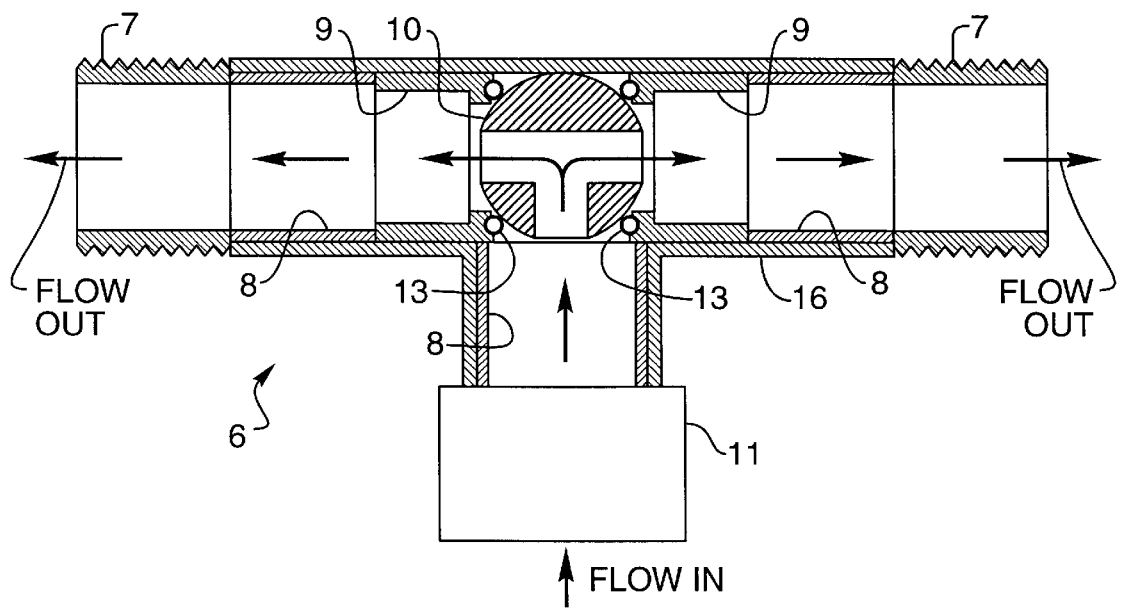
FIG. 7 is similar to FIG. 4, except that the control valve is in the "both" position, directing flow to both the right and left outflow connectors.

Referring now to FIG. 4, FIG. 5, FIG. 6 and FIG. 7, all of which are horizontal sections of the invention taken along plane B—B in FIG. 2, the flow passage configurations in valve 10 are illustrated for the four valve positions. FIG. 4 shows the "closed", or zero flow, position. FIG. 5 shows the "right" outflow position. FIG. 6 shows the "left" outflow position. FIG. 7 shows the "both" position, with equal and simultaneous flow to right and left outflow connectors.

It is to be understood that the invention may be realized with embodiments differing from the specific apparatus illustrated herein without departing from the scope of the present invention as delineated in the following claims.

I claim:

1. A flow divider for use in watering and irrigation systems, attachable to a water supply source, said flow divider comprising:

a swivel inlet flow connector attachable to a water supply source;

a multi-position control valve attached to and receiving flow from said swivel inlet flow connector; and a number of outflow connectors attached to and selectively receiving flow from said multi-position control valve;

whereby said outflow connectors may be swiveled to any convenient circumferential position around said swivel inlet flow connector during attachment of said swivel inlet flow connector to said water supply source, and water from said water supply source is distributed to selected outflow connectors by suitable positioning of said multi-position valve.

2. The flow divider according to claim 1 further made of metal.

3. The flow divider according to claim 1 further made of plastic.

4. The flow divider according to claim 1 wherein the swivel inlet flow connector and the number of outflow connectors have circular cross-sections.

5. The flow divider according to claim 1 wherein said swivel inlet flow connector has a female thread for attaching to a water supply source with a male thread.

6. The flow divider according to claim 1 wherein said number of outflow connectors have male threads for attaching to components of watering and irrigation systems with female threads.

7. The flow divider according to claim 1 wherein the number of outflow connectors is two, namely a right outflow connector and a left outflow connector on either side of said control valve, with flow in said outflow connectors in linearly opposed directions, further with said swivel inlet flow connector attached to said control valve in a direction perpendicular to said linearly opposed outflow connectors so that said flow divider assumes a T-shape with said control valve at the central T-junction.

8. The flow divider according to claim 7 wherein said control valve is a three-hole ball valve which can be rotated about an axis perpendicular to the plane of said swivel inlet flow connector and said outflow connectors to assume four positions 90 degrees apart to control flow from said swivel inlet flow connector to the right and left outflow connectors, said positions, respectively, (1) ducting flow to the right outflow connector, (2) to the left outflow connector,(3) to both the right and the left outflow connectors, and (4) closing off flow totally, thereby providing a variety of possibilities for the design of extended watering and irrigation systems which employ a plurality of said T-shaped flow dividers.

9. The flow divider according to claim 8 wherein further the three-hole ball valve is actuated by a selector handle attached to said valve, the correct placement of the handle to achieve a desired valve position being aided by indicia placed on the exterior of the flow divider.

* * * * *